US 8,037,136 B2

(12) United States Patent
Ivanov et al.

(10) Patent No.: US 8,037,136 B2
(45) Date of Patent: Oct. 11, 2011

(54) TRACKING A STATE OF A DOCUMENT ACCESSIBLE OVER A COMPUTER NETWORK

(75) Inventors: Ivailo Ivanov, Vancouver (CA); Darrell Lahey, Vancouver (CA); David Simpson, North Vancouver (CA); Philipp Ziegler, Vancouver (CA)

(73) Assignee: Business Objects Software Ltd, Dublin (IE)

( * ) Notice: Subject to any disclaimer, the term of this patent is extended or adjusted under 35 U.S.C. 154(b) by 225 days.

(21) Appl. No.: 12/402,258

(22) Filed: Mar. 11, 2009

(65) Prior Publication Data

US 2010/0235462 A1    Sep. 16, 2010

(51) Int. Cl.
*G06F 15/16* (2006.01)
(52) U.S. Cl. .......................... 709/205; 709/219; 709/230
(58) Field of Classification Search .................... 709/205
See application file for complete search history.

(56) References Cited

U.S. PATENT DOCUMENTS

| | | | | |
|---|---|---|---|---|
| 5,594,863 A * | 1/1997 | Stiles | ............................. | 714/15 |
| 6,330,566 B1 * | 12/2001 | Durham | ............................. | 1/1 |
| 6,421,729 B1 * | 7/2002 | Paltenghe et al. | ............ | 709/229 |
| 6,632,248 B1 * | 10/2003 | Isaac et al. | .................... | 715/273 |
| 6,704,907 B1 * | 3/2004 | Aoki et al. | ..................... | 715/255 |
| 7,003,721 B1 * | 2/2006 | Ramaley et al. | .............. | 715/210 |
| 2002/0016830 A1 * | 2/2002 | Nicolai | ......................... | 709/219 |
| 2002/0083013 A1 * | 6/2002 | Rollins et al. | ................... | 705/76 |
| 2005/0063333 A1 * | 3/2005 | Patron et al. | .................. | 370/329 |
| 2005/0240869 A1 * | 10/2005 | Leetaru et al. | ................ | 715/530 |
| 2007/0106577 A1 * | 5/2007 | Kopp et al. | ..................... | 705/35 |

OTHER PUBLICATIONS

Lei, Lihui et al. "Integrating Ajax and Web Services for Cooperative Image Editing." IT Pro. May/Jun. 2007. pp. 25-29.*

* cited by examiner

*Primary Examiner* — Andrew Caldwell
*Assistant Examiner* — Christopher Biagini
(74) *Attorney, Agent, or Firm* — Schwegman, Lundberg & Woessner, P.A.

(57) ABSTRACT

In an embodiment, a method is provided for tracking a state of a document that is accessible over a computer network. In this method, requests to modify the document are received by way of the computer network. A size of a set of these requests are identified to exceed a threshold size and an identifier that identifies this set of requests is generated. The identifier is then transmitted in a response to the requests by way of the computer network.

10 Claims, 10 Drawing Sheets

TRACKING A STATE OF A DOCUMENT ACCESSIBLE OVER A COMPUTER NETWORK

FIELD

The present disclosure relates generally to document access. In an embodiment, the disclosure relates to tracking a state of a document accessible over a computer network.

BACKGROUND

Currently, there are a variety of Web-based applications that allow users to create, modify, and view electronic documents online. Typically, such web-based applications do not store the documents on a user's computer, but rather store the documents on remote servers. The user may modify the document online using such an application, and if the modifications are acceptable, the user may save the document in computer storage. For example, the user makes the modification at his personal computer and in turn, the personal computer transmits a modification request to a remote server that stores the document in its non-volatile memory. Upon receipt of the request, the remote server temporarily modifies a copy of the document stored in random access memory until the user requests the document to be saved, at which point the remote server replaces the actual document stored on its non-volatile memory with the modified temporary document. For the modifications to succeed, the remote server must receive every single modification request made by the user. If just one single modification request is not received or received out of order, then the modifications to the temporary document do not reflect the actual modifications requested by the user.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for tracking a state of a document that is accessible over a computer network. Here, documents are stored at a remote server and are accessible over a computer network. A user at a client computer, for example, may create, modify, and view such documents. Before one of the documents is saved, the user may make modifications to the document. To track a state of the document before the save, modification requests are transmitted between the client computer and the remote server. As explained in more detail below, instead of transmitting all the modification requests between the client computer and the remote server, identifiers that represent groups of modification requests may be transmitted to reduce the amount of transmitted data.

Figure 1:
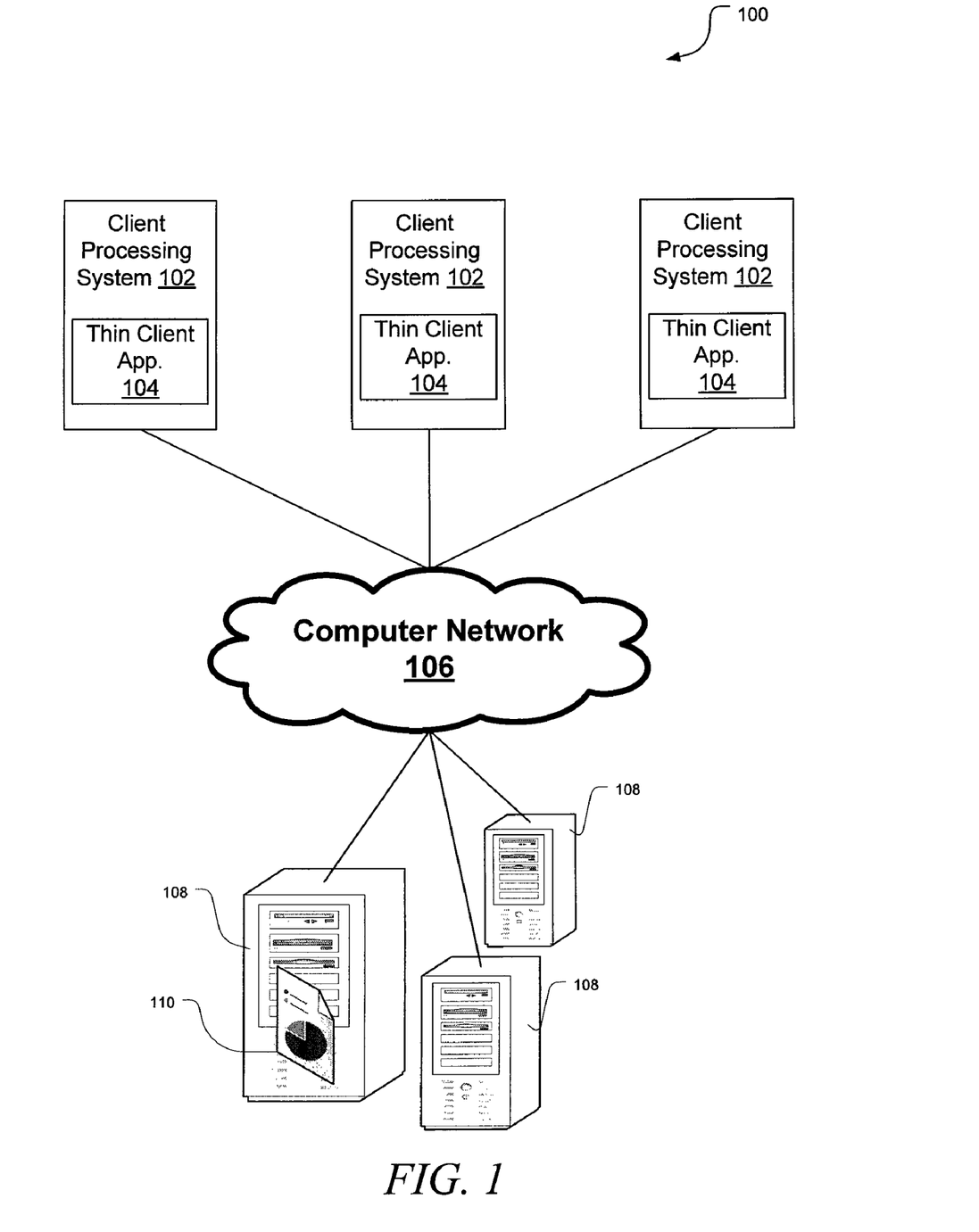
FIG. 1 depicts a diagram of a networked system, in accordance with an embodiment, for tracking a state of a document.

FIG. 1 depicts a diagram of a networked system 100, in accordance with an embodiment, for tracking a state of a document 110. The networked system 100 includes various processing systems 102 and 108 in communication by way of a computer network 106, which may include one or more Local Area Networks (LANs) and/or Wide Area Networks (WANs), such as the Internet. As depicted in FIG. 1, the networked system 100 includes client processing systems 102 and server processing systems 108. The document 110 is stored on one or more server processing systems 108, which provide server-side functionality, by way of the computer network 106, to one or more client processing systems 102.

A "document" 110, as used herein, refers to electronic media content that is accessible by computer technology. For example, the document 110 can be a file that is not an executable file or a system file and includes data for use by a computer program. Examples of the document 110 include a single or multiple files that are accessible by and/or associated with electronic document processing applications, such as word processing applications, document viewers, email applications, report designers, presentation applications, spreadsheet applications, diagramming applications, graphic editors, graphic viewers, enterprise applications, and other applications. Therefore, the document 110 may, for example, include a report, a spreadsheet, or a word processing document composed of alphanumeric texts, symbols, images, videos, sounds, and other data. It should be appreciated that the document 110 can have a variety of file formats that, for example, may be identified by data within the document 110 itself and/or by its filename extension. Examples of file formats that may be associated with the document 110 include Crystal Reports (RPT) format, Hypertext Markup Language (HTML) format, eXtensible Markup Language (XML) format, Microsoft Excel file format, and Tag Image File Format (TIFF).

It should be noted that a "report," as used herein, refers to information that may be automatically retrieved (e.g., in response to computer executable instructions) from a data structure, where the information is structured in accordance with a report schema that specifies the form in which the information should be presented. A data structure provides context for the organization of data, and examples of data structures include tables, arrays, linked lists, databases, data warehouses, plurality of reports, and other data structures. On the other hand, a non-report is an electronic document that is constructed without, for example, the automatic retrieval of information from a data structure. Examples of non-report electronic documents include typical business application documents, such as a word processor document, a presentation document, and the like.

For example, a report may specify how to access and format the data, which can be saved in the report. The data is often accessed from a data structure and the act of accessing is called refreshing the report. The report is created at design time and used at run or query time. In composition and use, the report can share features with non-report documents but the report by design is primarily for accessing, formatting, transforming and/or presenting external data. That is, such an example of a report can be specifically designed to facilitate working with external data structures. In addition to information regarding external data structure connection drivers, the report may specify advanced filtering of data, information for combining data from different external data structures, information for updating join structures and relationships in report data, and instructions including logic to support a more complex internal data model (that may include additional constraints, relationships, and metadata).

Each client processing system 102 may host a thin client application 104 (e.g., a Web browser, an electronic document processing application, and a document software development kit (SDK)) that enables a user from a client processing system 102 to view, modify, and/or create the document 110 at one of the storage processing systems 108. For example, the thin client application 104 can access various services and functions supported by the server processing systems 108 by way of the computer network 106. In the embodiment of FIG. 1, the server processing systems 108 do most of the processing for rendering, modifying, and/or creating the document 110. For example, a user may use a Web browser to modify the document 110 stored at one of the server processing systems 108. In turn, the Web browser submits a request to the server processing system 108 to modify the document 110. A "request," as used herein, generally refers to a message associated with the creation, modification, and viewing of the document 110. In an example, the request may include one or more instructions to modify the document 110 and may also include a data payload associated with the instructions. For example, the request may include instructions to insert an image into the document 110 and also include a data payload of an image file. In another example, the request may include instructions to insert a table into the document 110 and include a data payload of data representing the table.

Upon receipt of the request, a server processing system 108 modifies the document 110 and provides an updated rendering of the modified document 110 for display at the Web browser, which is executed at the client processing system 102. As explained in more detail below, the server processing system 108 or the client processing system 102 can also track a state of the document 110. It should be noted that while the networked system 100 shown in FIG. 1 employs a client-server architecture, the present disclosure is not limited to such an architecture and could equally well find application in a distributed or peer-to-peer architecture system.

Figure 2:
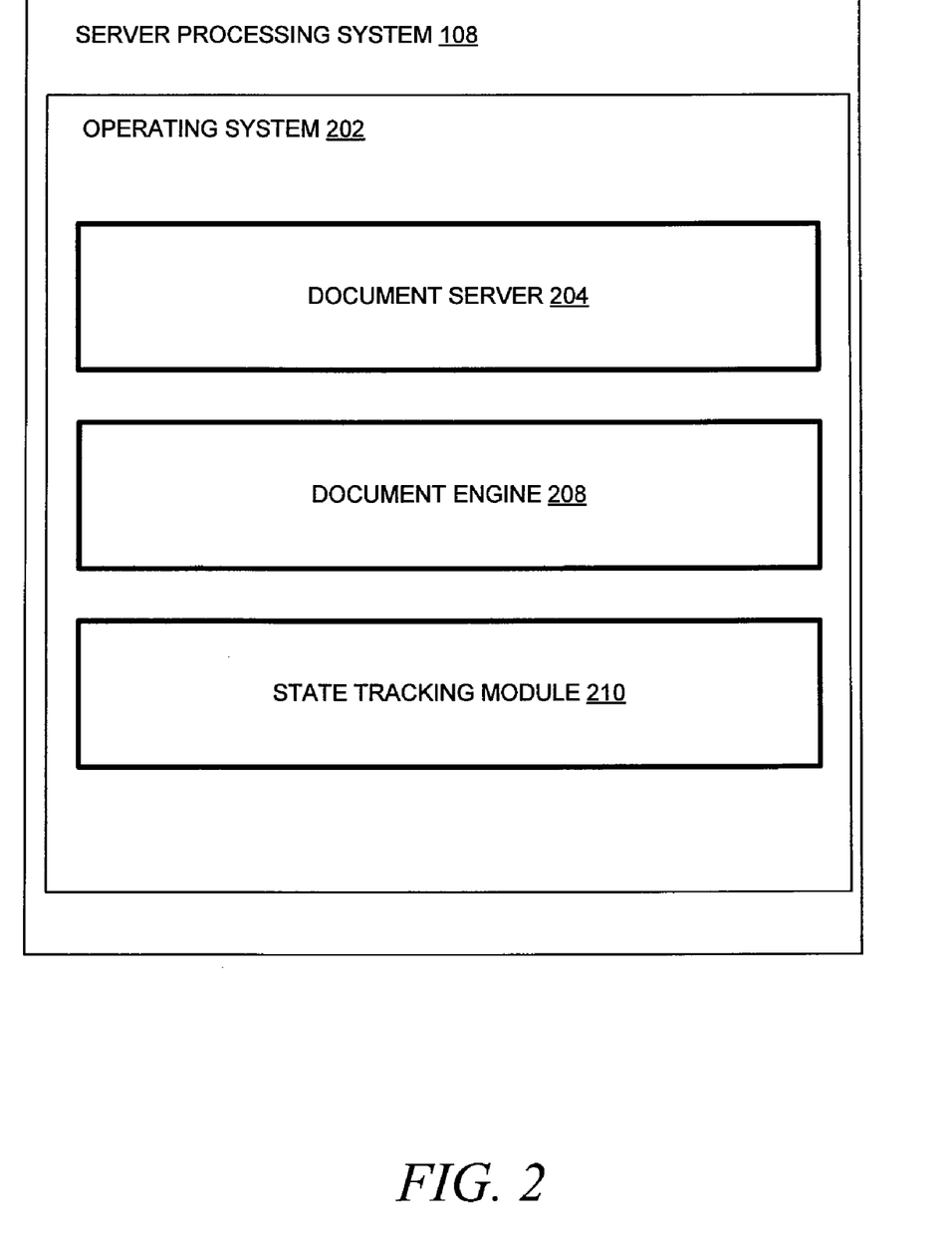
FIG. 2 depicts a block diagram of a server processing system, in accordance with an embodiment, that is configured to track a state of a document.

FIG. 2 depicts a block diagram of a server processing system 108, in accordance with an embodiment, that is configured to track a state of a document. It should be appreciated that the server processing system 108 may be deployed in the form of a variety of server computers, such as application servers and Web servers. The server processing system 108 is deployed in a networked environment, such as the networked system 100 depicted in FIG. 1. In various embodiments, the server processing system 108 may be used to implement computer programs, logic, applications, methods, processes, and/or software to track a state of a document, which is described in more detail below.

The server processing system 108 executes an operating system 202 that manages the software processes and/or services executing on this server processing system 108. As depicted in FIG. 2, these software processes and/or services may include a document server 204, a document engine 208, and a state tracking module 210. The document server 204 is configured to share, schedule, and deliver documents over a computer network, in email, and in other documents. As an example, the document server 204 allows a user to access documents on the Web. The document engine 208 is configured to process the documents, such as processing requests to create and modify the documents.

The state tracking module 210 is configured to communicate with one or more client processing systems regarding requests related to, for example, viewing, modifying, and creating the document stored at the server processing system 108. Depending on the type of request, the state tracking module 210 may call the document server 204 and/or document engine 208 to process the document. In addition to communicating with the client processing systems, the state tracking module 210 is configured to track a state of a document. A "state" of a document, as used herein, refers to a condition of a document with regard to its form, modification, and/or composition. In tracking the state of a document, the state tracking module 210 can reduce the size of requests transmitted between the client processing systems and the server processing system 108. As explained in more detail below, the size of the requests can be reduced by, for example, substituting a series of requests with an identifier and communicating the identifier instead of the series of requests.

It should be appreciated that in other embodiments, the server processing system 108 may include fewer, more, or different modules apart from those shown in FIG. 2. For example, in an alternate embodiment, the state tracking module 210 may be integrated with either the document server 204 or the document engine 208.

Figure 3:
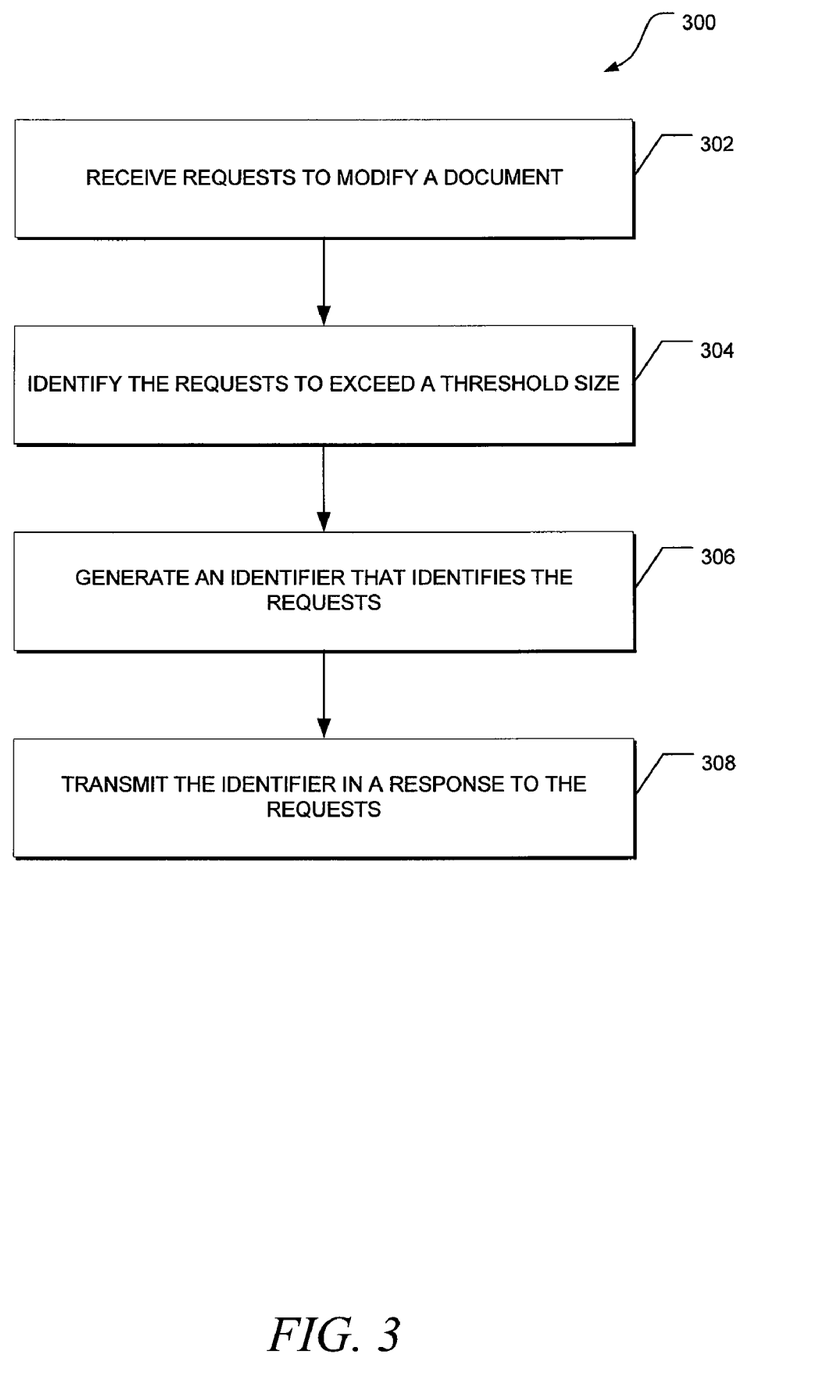
FIG. 3 depicts a flow diagram of a general overview of a method, in accordance with an embodiment, for tracking a state of a document that is accessible over a computer network.

FIG. 3 depicts a flow diagram of a general overview of a method 300, in accordance with an embodiment, for tracking a state of a document that is accessible over a computer network. In an example, the method 300 may be implemented by the state tracking module 210 and employed in the server processing system 108 of FIG. 2. As depicted in FIG. 3, the server processing system at 302 receives multiple requests from a client processing system to modify a document stored on the server processing system or on another processing system (e.g., a network attached storage system) accessible by the server processing system.

With the receipt of the requests, a size of a set of the requests is identified at 304 to exceed a threshold size, which is a predefined value defining an upper limit of the size of one or more requests. As used herein, a "set of requests" refers to all or a number of the received requests. As a result of exceeding the threshold size, an identifier that identifies the set of requests is generated at 306. An "identifier," as used herein, refers to a value (numeric and/or textual) that uniquely identifies one or more requests to modify a document. As explained in more detail below, the identifier may be, for example, a name of a modified document or a name of a file or data structure storing the requests. The requests identified by the identifier may, in an embodiment, be stored at a server processing system. In an alternate embodiment, these requests may also be stored at a client processing system.

It should be appreciated that to keep track of the requests received from the client processing system, the server processing system is configured to transmit the previously submitted requests back to the client processing system that issued the requests. When the client processing system issues new requests to the server processing system, these previous requests are also retransmitted back to the server processing system such that the server processing system has a record of what was previously transmitted by the client processing system. As explained in more detail below, these exchanges of previous requests allow a state of the document to be recovered if either the client processing system or the server processing system fails.

To reduce the size of the exchanged requests, the server processing system may not return all the previous requests. Instead, as depicted at 308, the server processing system transmits the identifier in a response to the requests back to the client processing system. As a result, the set of requests may be substituted or replaced with just a reference to the identifier, which is much smaller in size than all the series of requests identified by the identifier.

Figure 4:
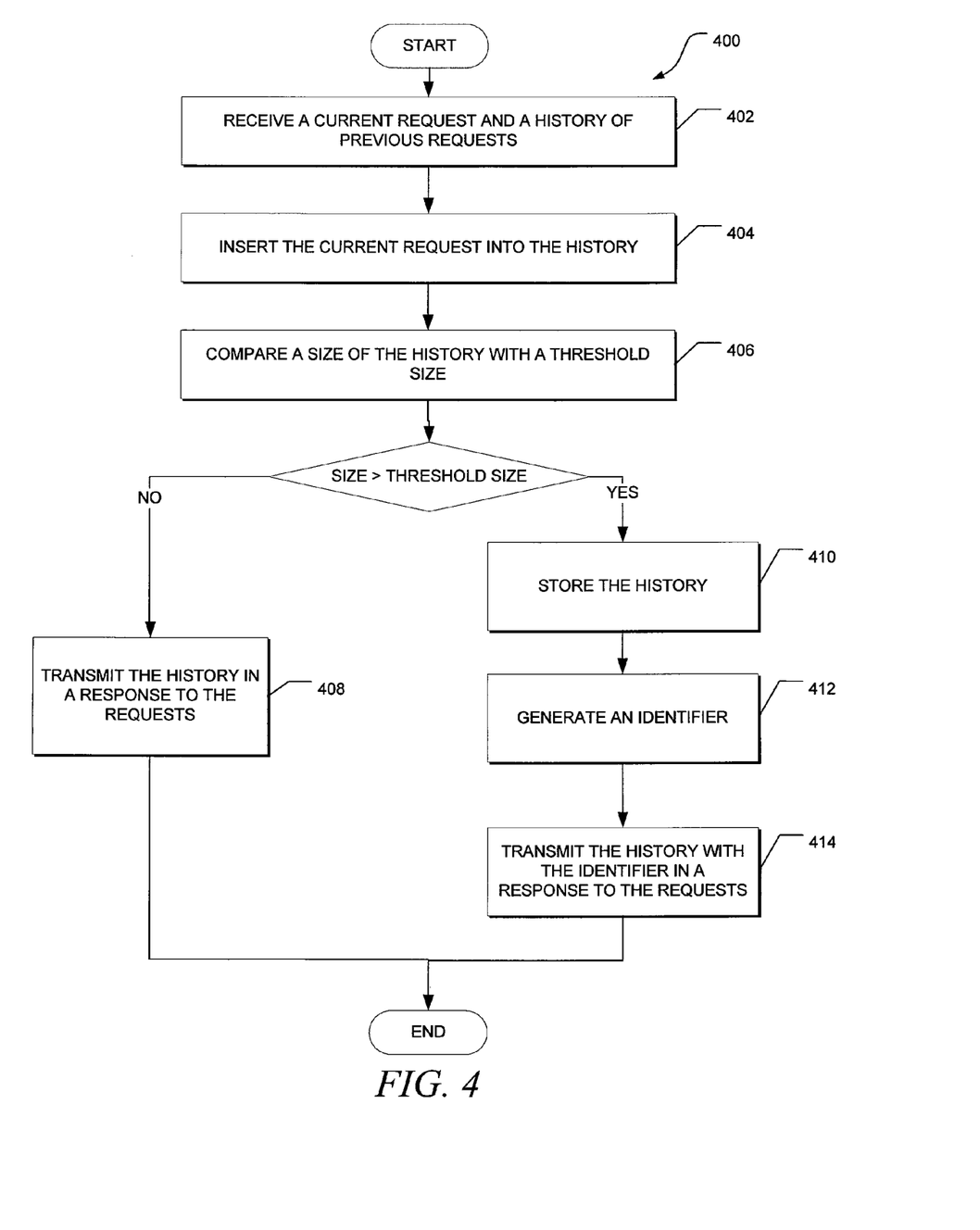
FIG. 4 depicts a flow diagram of a detailed method consistent with an alternate embodiment for tracking a state of a document that is accessible over a computer network.

FIG. 4 depicts a flow diagram of a detailed method 400 consistent with an alternate embodiment for tracking a state of a document that is accessible over a computer network. At 402, a server processing system receives a current request from a client processing system to modify a document stored on the server processing system or on another processing system accessible by the server processing system. In this embodiment, the server processing system also receives a history of previous requests, which is a record of previous requests to modify the document that is attached to or included with the current request.

In an embodiment, the current request may then be inserted into the history at 404 and a size of the history with the current request is compared with a threshold size at 406. In an alternate embodiment, the current request is not initially inserted into the history before the comparison. Instead, a sum of the size of the current request and the size of the history is compared with the threshold size. If the size of the history is less than the threshold size, then the history with the current request is relatively small in size and does not need to be reduced. As a result, the server processing system at 408 transmits the history in a response back to the client processing system such that the client processing system also has a record of the state of the modified document since the last save. As explained previously, the client processing system will then transmit this history back to the server processing system when the user makes another request to modify the document.

On the other hand, if the size of the history exceeds the threshold size, then the history (with the current request) is of relatively large size and needs to be reduced. As referenced at 410, the history is stored and an identifier that identifies the history, which has a smaller size than the history of previous requests, is generated at 412. In an embodiment, the history is stored at the server processing system. In an alternate embodiment, this history may be stored at the client processing system. Embodiments of the invention may implement a wide variety of mechanisms for storing the history. For example, in one embodiment, the history is stored in a file or a data structure. The identifier may be the name of a file or a data structure. Alternatively, the identifier may be a pointer (e.g., a Uniform Resource Identifier (URI)) that specifies a location of the file or data structure. In another example, multiple histories may be stored in a file or a data structure and, in this embodiment, the identifier identifies a particular index (e.g., a primary key value or an XML tag) that references a section or portion in the file or data structure that includes the particular history.

In an alternate embodiment, the history is stored by modifying the document based on the history and storing this modified document separately from the actual document until the user requests a save, which is described in more detail below. Here, the identifier identifies a filename of or pointer to the modified document. As an example, upon receipt of the history, the server processing system retrieves the actual document from non-volatile memory and modifies the document by applying the requests for modification to the document as defined in the history. This modified document may be stored temporarily in volatile memory and may be modified yet again when the history is updated. Alternatively, this modified document may be stored separately from the actual document stored in non-volatile memory. Subsequently, this modified document can be located by referencing its identifier. When the user requests that the document be saved, the actual document is replaced with the modified document.

It should be appreciated that an identifier can be defined relative to an earlier identifier. For example, a server processing system can store relative identifiers with multiple histories of groups of requests. As a number of requests increases, the server processing system can create an absolute identifier and then generate subsequent identifiers relative to this absolute identifier. As the server processing system creates new identifiers, it can thereby accordingly delete or replace identifiers.

Still referring to FIG. 4, after the identifier is generated, the identifier replaces the group of requests identified by the identifier in the history and the history with the identifier is transmitted at 414 in a response back to the client processing system. The response may be in the form of a message or a segment of data. For example, the response may include a cookie, which is a segment of text sent by a server processing system to a client processing system (e.g., a Web browser) and sent back by the client to the processing system each time it accesses the server processing system.

Figure 5A:
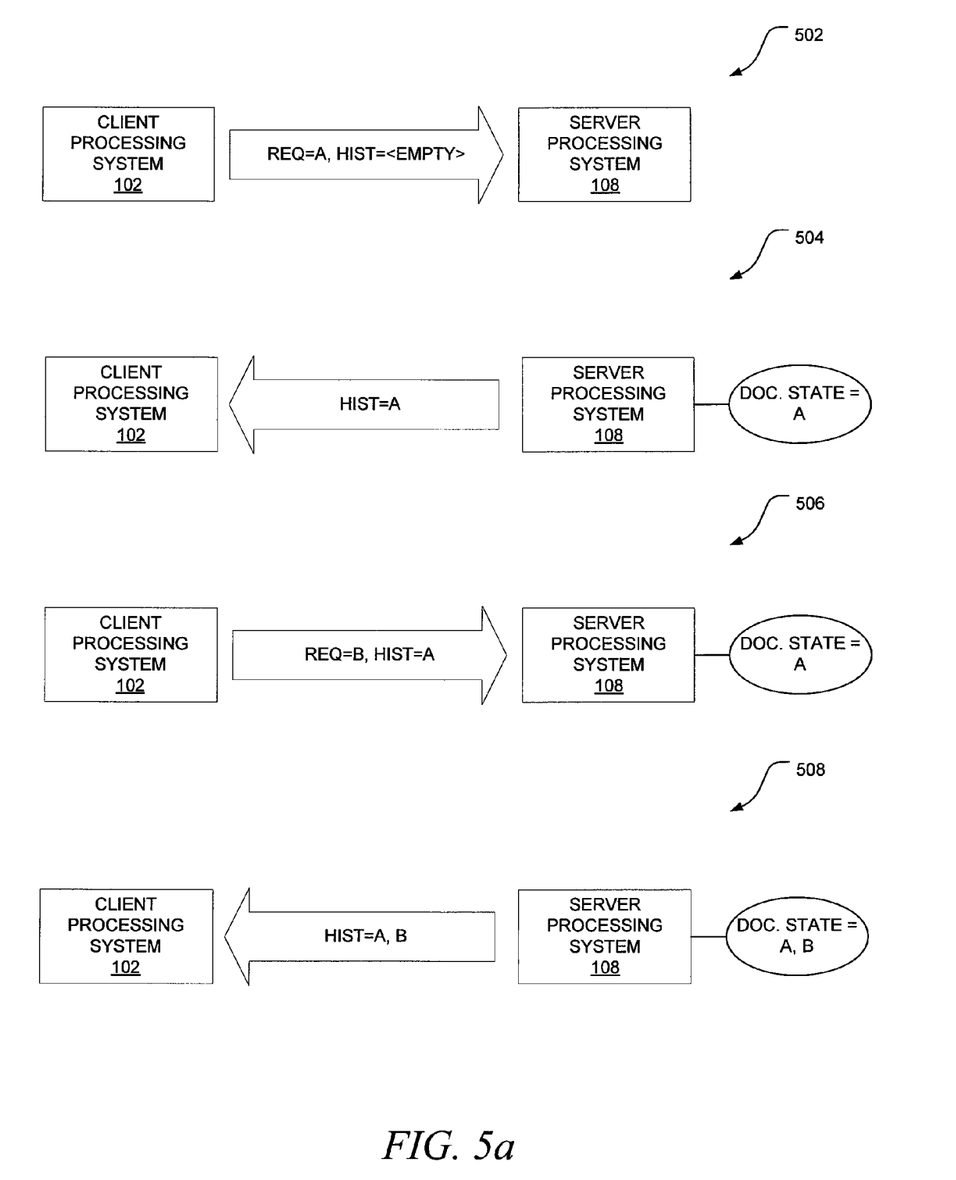
FIGS. 5a and 5b depict diagrams illustrating an example of a server processing system tracking a state of a document in the form of a report.
Figure 5B:
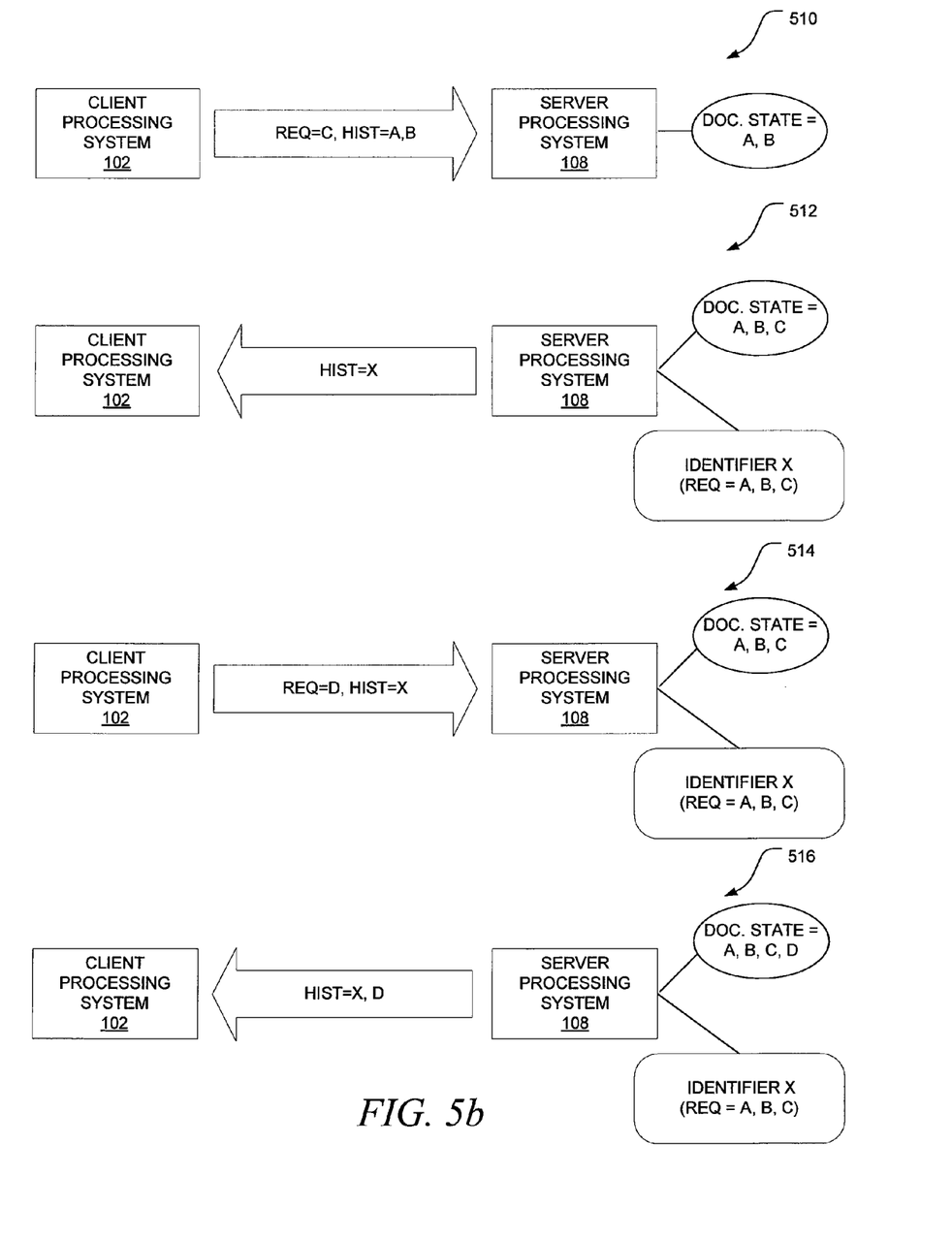

FIGS. 5A and 5B depict diagrams illustrating an example of a server processing system 108 tracking a state of a document in the form of a report. In this example, a client processing system 102 and a server processing system 108, which are in communication by way of a computer network, are provided. The server processing system 108 is configured to store the report and a user can view and modify the report from the client processing system 102. As depicted at 502 of FIG. 5A, the client processing system 102 transmits to the server processing system 108 a request A to modify the report. Since this is the first request made by the client processing system 102, there were no previous requests and, as a result, there is no history of previous requests transmitted to the server processing system 108.

Upon receipt of the request A, as depicted at 504, the server processing system 108 inserts the request A into the history and compares a size of this history with a threshold size. In this example, the size of the history is identified to be less than the threshold size and accordingly, the server processing system 108 transmits the history with the previous request A back to the client processing system 102 in the form of, for example, a cookie. At this point, a current state of the report (or document state), as depicted at 504, is the report with request A for modification applied, but it should be noted that the actual report stored on the server processing system 108 is not actually modified. The states of the document depicted in FIGS. 5A and 5B are shown to identify the various states of the report before the report is saved. However, it should further be noted that the document state may be contents of a memory of the server processing system 108 that represent a state of a currently open report. For example, in an embodiment, the request A may be stored in the volatile memory of the server processing system. Alternatively, in another embodiment, a modified report based on request A may be stored in a non-volatile memory separately from the actual report. In yet another embodiment, the request A may not be stored in the server processing system 108 at all because, as explained in more detail below, the server processing system 108 can recover or identify the history of previous requests from the messages (requests/responses) exchanged between the client processing system 102 and server processing system 108.

As depicted at 506, the client processing system 102 subsequently submits or transmits another request B for a different modification, and attached to the request B is a cookie with the history of previous requests, which includes previous request A. Upon receipt of the request B and history from the client processing system 102, the server processing system 108 inserts the request B into the history and compares the new size of the history with the threshold size. At 508, the size of the history is still less than the threshold size and, as a result, the server processing system 108 transmits the history in a response back to the client processing system 102. At this point, a current state of the report, as depicted at 508, is the report with request A and request B applied.

In reference to FIG. 5B at 510, the client processing system 102 transmits yet another request C to modify the report, and attached to the request C is a history of previously submitted requests A and B. Upon receipt of the request C and the history, the server processing system 108 inserts the request C into the history and identifies that the size of the new history exceeds the threshold size. Instead of directly transmitting the history back to the client processing system 102, the server processing system 108 generates an identifier X (e.g., a filename) that identifies the history with requests A, B, and C and substitutes or replaces all three requests A, B, and C in the history with this identifier X. The size of the history with the identifier X is smaller than the size of the history with all previous requests A, B, and C, which include instructions and possibly data payloads. As depicted at 512, the server processing system 108 then transmits the history with the identifier X in a cookie back to the client processing system 102. The requests A, B, and C are stored in a file that may be located based on its filename identifier X.

As depicted at 514, the client processing system 102 then transmits another request D to modify the report to the server processing system 108, and attached to the request D is a history comprising requests with an identifier X. The server processing system 108 inserts the request D into the history and identifies that the new size of the history is less than the threshold size. As depicted at 516, the server processing system 108 then transmits the history with request D and identifier X in a response back to the client processing system 102. At 516, a current state of the report shows the report with requests A, B, C, and D applied, and it should be noted that these requests will be applied to the actual report once the user requests the report to be saved, which is described in more detail below.

Figure 6:
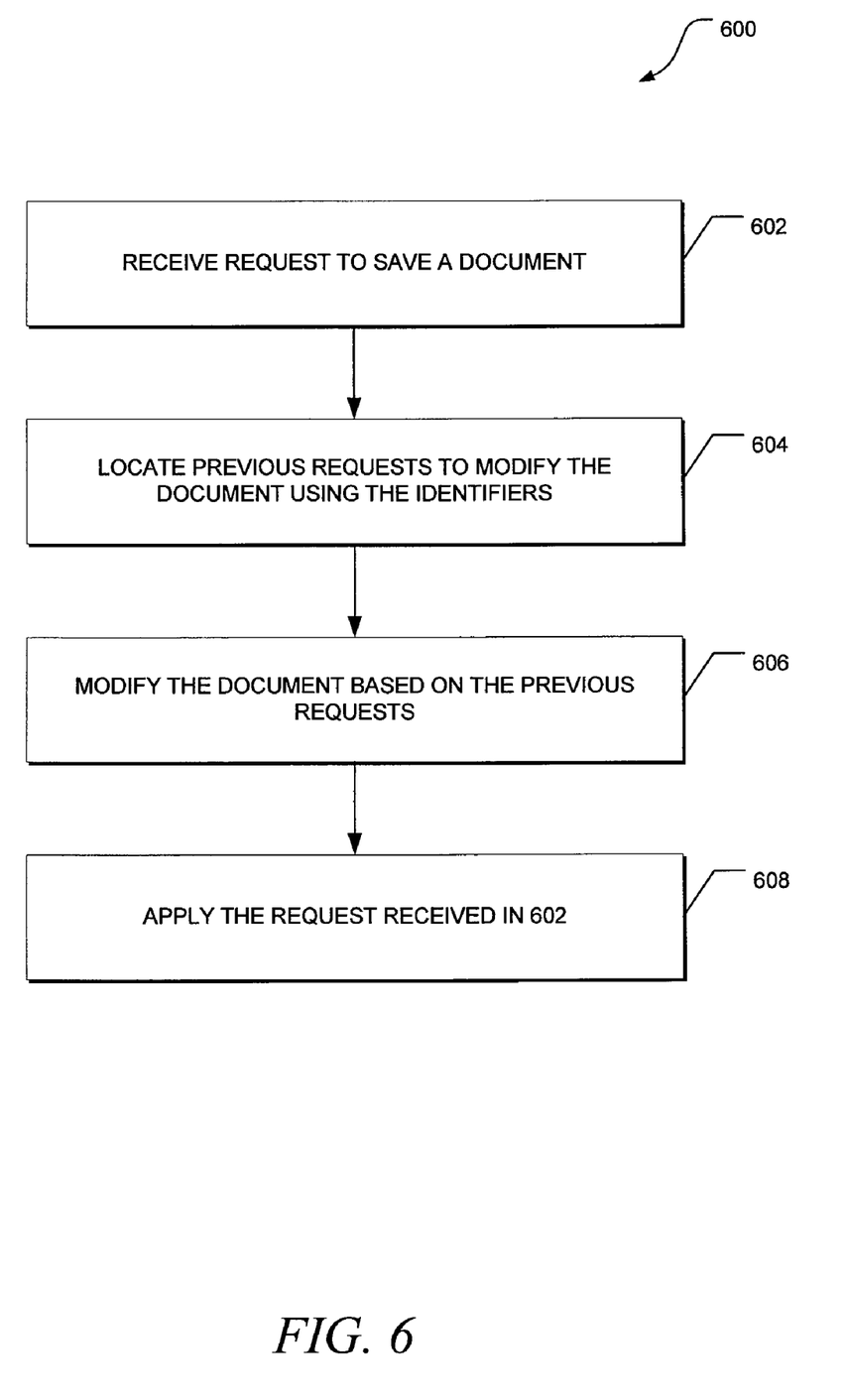
FIG. 6 depicts a flow diagram of a general overview of a method, in accordance with an embodiment, for processing a request to save the document in non-volatile memory.

FIG. 6 depicts a flow diagram of a general overview of a method 600, in accordance with an embodiment, for recovery after a failure of, for example a server processing system. In an example, the method 300 may be implemented by the state tracking module 210 and employed in the server processing system 108 of FIG. 2. In the embodiment of FIG. 6, a document is stored in the non-volatile memory of a document processing system. At 602, the server processing system receives a request from a user to save the document. This request is any request that the server first receives after a failure of the server processing system. Attached to this request to save the document is a history of previous requests to modify the document, which may include previous requests and identifiers identifying groups of previous requests.

As depicted at 604, a set of the previous requests to modify the document are located using the identifiers from the history. For example, in an embodiment, the identifier may be a URI that refers to or points to a file with the previous requests. The server processing system locates the file based on the identifier and accesses a series of previous requests from the file. At 606, the actual document may then be loaded into volatile memory and modified based on the previous requests. Thereafter, as depicted at 608, the request previously received at 602 is applied to the document. The modified document is then saved in non-volatile memory. That is, the actual document stored in the non-volatile memory is replaced with the modified document.

It should be noted that each request has an order relative to each other request. That is, the requests may be ordered based on the time when the user submitted each request, and the modifications applied based on this order. For example, a request that has been received prior to another request will be applied before this other request. To track the order, the requests and the identifiers may be communicated in the order in which each request or identifier was submitted. Alternatively, the order of the requests and the identifiers may be identified by a value assigned to each request or identifier, which may be stored with each request and identifier.

In an alternate embodiment, the identifier may instead refer to a separate document that has been modified based on the previous requests. This separate document is stored separately from the actual document. When the user requests the document to be saved, the server processing system locates this separate document based on the identifier and replaces the actual document with this separate document with the modifications.

Figure 7A:
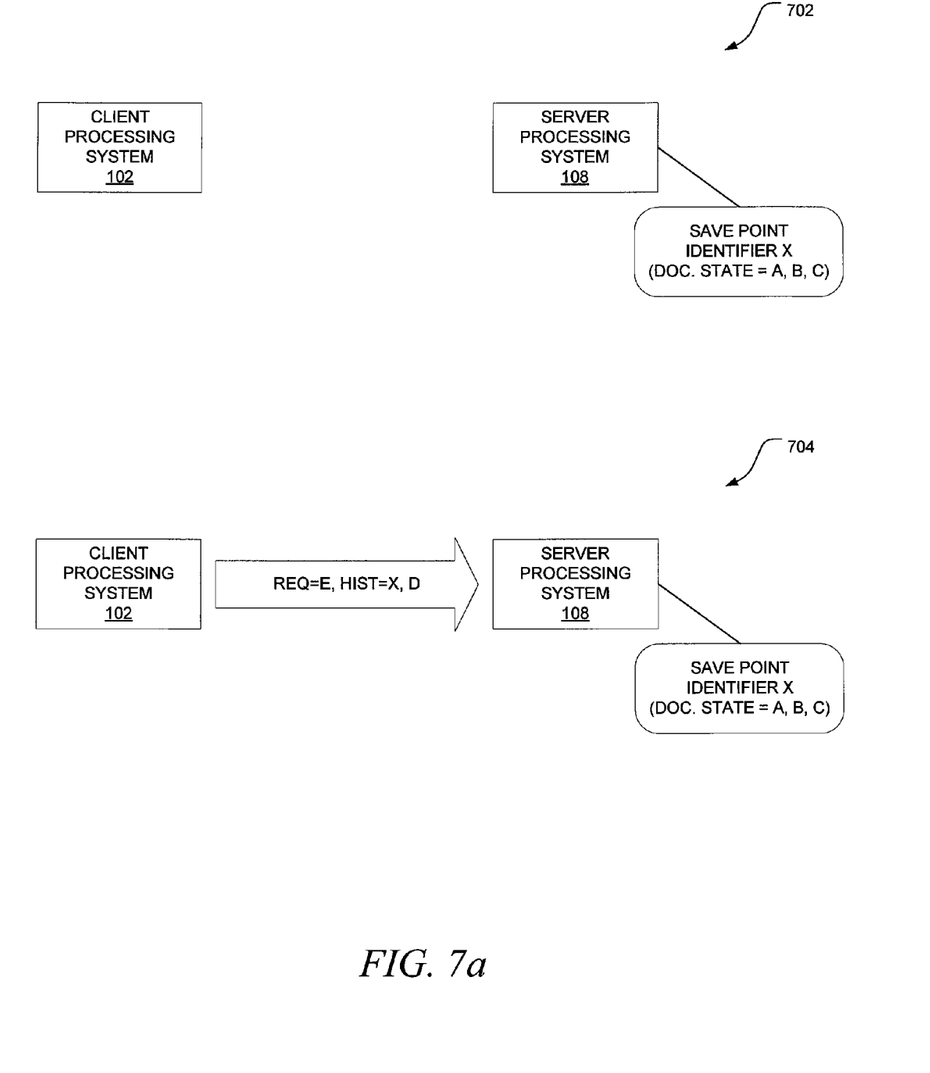
FIGS. 7A and 7B depict diagrams illustrating an example of recovering a state of a document in a failover operation.
Figure 7B:
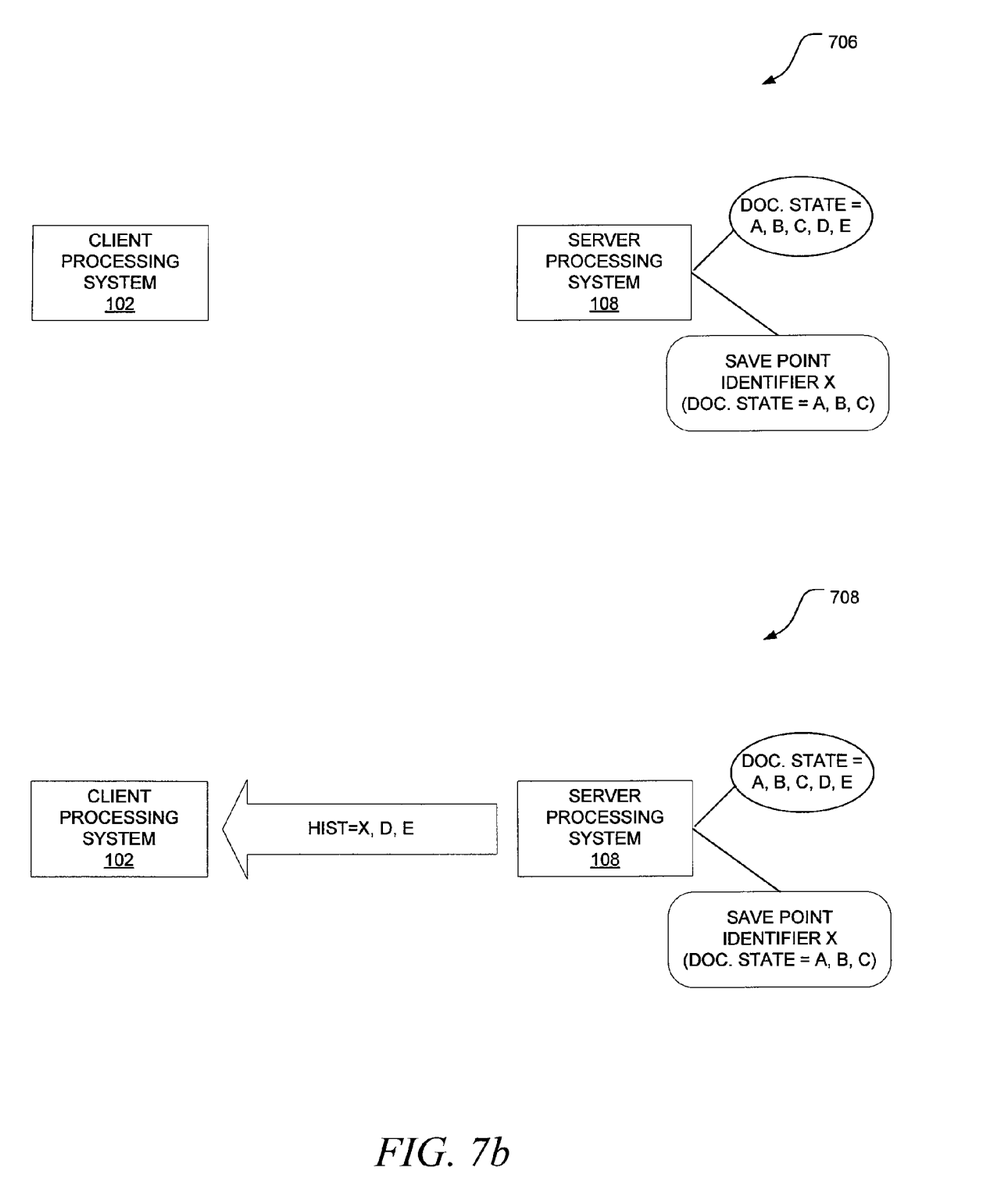

FIGS. 7A and 7B depict diagrams illustrating a recovery of a state of a document in a failover operation. In this example, a client processing system 102 and a server processing system 108 are provided. The server processing system 108 is configured to store the document in the form of a report and a user can view and modify the report from the client processing system 102. As depicted at 702 in FIG. 7A, the state of the report is not available to the server processing system 108 because, for example, the server processing system 108 closed the state as a result of too many processes or the server processing system 108 crashed, thereby losing the state in its volatile memory. It should be noted that in this example, the state of the report immediately before being lost is the same state as depicted in 516 of FIG. 5B. However, returning to FIG. 7A, the client processing system 102 has the history of previous requests, which may be used by the server processing system 108 to rebuild the state of the report.

Before the loss of the state, the server processing system 108 transmits the history with the previous requests to the client processing system 102. By transmitting the history back to the client processing system 102, the state of the report is effectively stored in both the client processing system 102 and the server processing system 108. As depicted at 704, the client processing system 102 submits a current request E to modify the report and a cookie with the history is attached to this current request. The server processing system 108 receives this current request E with the cookie and identifies an identifier X from the history. The server processing system 108 then locates a series of previous requests using this identifier X and replaces the identifier X with these previous requests.

In the failover operation depicted at FIG. 7B, at 706 the server processing system 108 then rebuilds the state of the report based on the current request E and the history of previous requests. With the state of the report rebuilt, the server processing system 108 then transmits the history comprising the identifier X and requests D and E in a cookie at 708 back to the client processing system 102.

Figure 8:
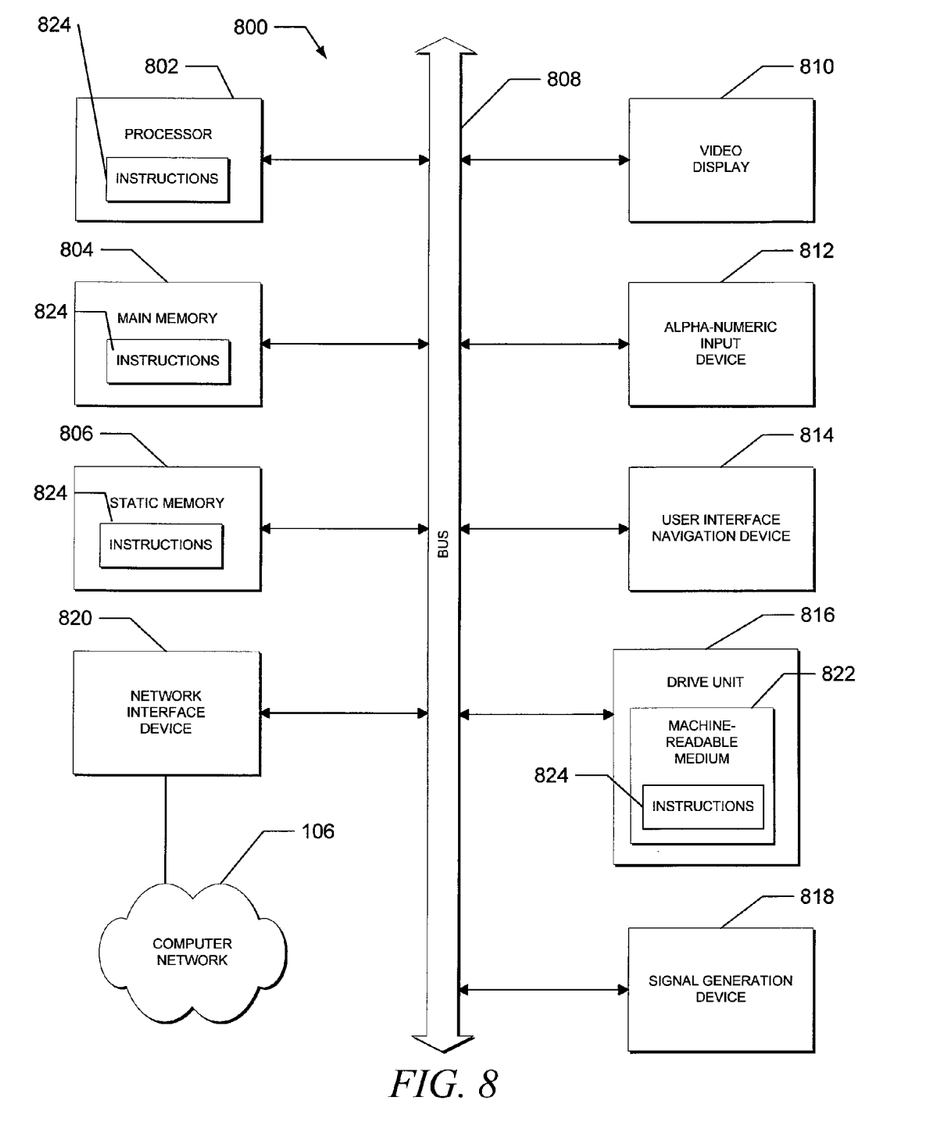
FIG. 8 depicts a block diagram of a machine in the example form of a processing system within which a set of instructions, for causing the machine to perform any one or more of the methodologies discussed herein, may be executed.

FIG. 8 depicts a block diagram of a machine in the example form of a processing system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 800 includes a processor 802 (e.g., a central processing unit (CPU), a graphics processing unit (GPU) or both), a main memory 804 (e.g., random access memory (a type of volatile memory)), and static memory 806 (e.g., static random access memory (a type of volatile memory)), which communicate with each other via bus 808. The processing system 800 may further include video display unit 810 (e.g., a plasma display, a liquid crystal display (LCD) or a cathode ray tube (CRT)). The processing system 800 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of instructions and data structures 824 (e.g., software) embodying or utilized by any one or more of the methodologies or functions described herein. The instructions and data structures 824 may also reside, completely or at least partially, within the main memory 804 and/or within the processor 802 during execution thereof by processing system 800, with the main memory 804 and processor 802 also constituting machine-readable, tangible media.

The instructions and data structures 824 may further be transmitted or received over a computer network 106 via network interface device 820 utilizing any one of a number of well-known transfer protocols (e.g., HTTP).

While the embodiment(s) is (are) described with reference to various implementations and exploitations, it will be understood that these embodiments are illustrative and that the scope of the embodiment(s) is not limited to them. In general, techniques tracking a state of a document may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A non-transitory, machine-readable medium that stores instructions, which when performed by a machine, cause the machine to perform operations comprising:
   receiving a request to modify a document, the request comprising a current request to modify the document and a history comprising a plurality of previous requests to modify the document, the request being received by way of a computer network;
   identifying the current request and the history as being less than a threshold size;
   inserting the current request into the history;
   transmitting the history in a response to the request, the response being transmitted by way of the computer network;
   receiving a further request to modify the document, the further request comprising a further current request and the history;
   identifying the further current request and the history as exceeding the threshold size;
   inserting the further current request into the history;
   storing the history;
   generating an identifier identifying a set of the plurality of previous requests included in the history;
   replacing the set of the plurality of previous requests in the history with the identifier; and
   transmitting the history in a further response to the further request, the further request being transmitted by way of the computer network.

2. The non-transitory, machine-readable medium of claim 1, wherein the operation of identifying the current request and the history as being less than the threshold size comprises comparing a size of the current request and the history with the threshold size.

3. The non-transitory, machine-readable medium of claim 1, wherein the response is a cookie.

4. The non-transitory, machine-readable medium of claim 1, wherein the identifier is a Uniform Resource Identifier (URI).

5. The non-transitory, machine-readable medium of claim 1, wherein the document is a report.

6. A method of tracking a state of a document accessible over a computer network, the method comprising:
   receiving a request to modify a document, the request comprising a current request to modify the document and a history comprising a plurality of previous requests to modify the document, the request being received by way of a computer network;
   identifying the current request and the history as being less than a threshold size;
   inserting the current request into the history;

transmitting the history in a response to the request, the response being transmitted by way of the computer network;
receiving a further request to modify the document, the further request comprising a further current request and the history;
identifying the further current request and the history as exceeding the threshold size;
inserting the further current request into the history;
storing the history;
generating an identifier identifying a set of the plurality of previous requests included in the history;
replacing the set of the plurality of previous requests in the history with the identifier; and
transmitting the history in a further response to the further request, the further request being transmitted by way of the computer network.

7. The method of claim 6, wherein the identifying of the current request and the history as being less than the threshold size comprises comparing a size of the current request and the history with the threshold size.

8. The method of claim 6, wherein the response is a cookie.

9. The method of claim 6, wherein the identifier is a Uniform Resource Identifier (URI).

10. The method of claim 6, wherein the document is a report.

* * * * *